US010424104B2

(12) United States Patent
Takaya et al.

(10) Patent No.: US 10,424,104 B2
(45) Date of Patent: Sep. 24, 2019

(54) THUMBNAIL IMAGE CREATION APPARATUS, AND 3D MODEL DATA MANAGEMENT SYSTEM

(71) Applicant: CANON KABUSHIKI KAISHA, Tokyo (JP)

(72) Inventors: Satomi Takaya, Kamo-gun (JP); Tsunehiro Tsukada, Yokohama (JP); Naoki Tanaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/167,723

(22) Filed: May 27, 2016

(65) Prior Publication Data
US 2016/0358369 A1    Dec. 8, 2016

(30) Foreign Application Priority Data
Jun. 4, 2015  (JP) .................................. 2015-114268

(51) Int. Cl.
*G06T 15/20*    (2011.01)
*G06T 19/00*    (2011.01)

(52) U.S. Cl.
CPC .............. *G06T 15/20* (2013.01); *G06T 19/00* (2013.01)

(58) Field of Classification Search
None
See application file for complete search history.

(56) References Cited

U.S. PATENT DOCUMENTS

| 5,864,482 A * | 1/1999 | Hazama | G05B 19/4097 700/182 |
|---|---|---|---|
| 2004/0085338 A1 | 5/2004 | Terashima et al. | |
| 2009/0007018 A1* | 1/2009 | Ikeda | G06F 17/3028 715/838 |
| 2010/0111501 A1* | 5/2010 | Kashima | G06T 11/60 386/212 |
| 2010/0198563 A1* | 8/2010 | Plewe | G06F 17/5004 703/1 |

FOREIGN PATENT DOCUMENTS

| JP | 2004-151979 A | 5/2004 |
|---|---|---|
| JP | 2006-072837 A | 3/2006 |
| JP | 2007-316993 A | 12/2007 |

OTHER PUBLICATIONS

Susumu Endo, et. al., "Shape-Based 3D Model Retrieval Method Using Browsing," May 17, 2007, IEICE Technical Report, vol. 107, No. 58, pp. 91-96, translation included (20 pages).

* cited by examiner

*Primary Examiner* — Said Broome
(74) *Attorney, Agent, or Firm* — Canon USA, Inc., IP Division

(57) ABSTRACT

A thumbnail image creation apparatus includes at least one processor coupled to at least one memory. The at least one processor is programmed to create a thumbnail image of a three-dimensional (3D) model contained in 3D model data, and a thumbnail image is created so that the thumbnail image contains a feature portion of the 3D model.

7 Claims, 4 Drawing Sheets

THUMBNAIL IMAGE CREATION APPARATUS, AND 3D MODEL DATA MANAGEMENT SYSTEM

BACKGROUND OF THE INVENTION

Field of the Invention

The present disclosure generally relates to three-dimensional (3D) modeling and, more particularly, to a thumbnail image creation apparatus, and a 3D model data management system.

Description of the Related Art

In recent years, a solid modeling technique called additive manufacturing (AM), three-dimensional printing, rapid prototyping (RP), or the like has drawn attention.

Data used in the solid modeling technique is data obtained by processing, for use in modeling, three-dimensional data input and created by a 3D scanner or 3D-computer aided design (CAD) system, and is generally called three-dimensional shape data, or 3D model data.

The 3D model data refers to a model representing a solid shape with a combination of so-called polygons (triangles), and is created, by using modeling software, through editing and processing for obtaining a shape that a user desires in addition to modification for enabling modeling. The 3D model data subjected to editing and processing in this way is stored in a modeling software's own file format, and is managed with a method appropriate to a use environment of each user.

Meanwhile, a various pieces of 3D model data are created, and it is therefore difficult to identify each piece of three-dimensional model data by using only a file name or meta information of a file. Because of this, included among pieces of modeling software is software that creates a thumbnail image of three-dimensional model data for the purpose of facilitating identification of the content of a file and that displays it in association with 3D model data.

In creation of a thumbnail image of 3D model data, it is difficult to select an optimal viewpoint. This is because an image of a 3D model viewed from a specific viewpoint is not necessarily an image that is highly recognizable in accordance with the shape or orientation of the 3D model data.

Japanese Patent Laid-Open No. 2004-151979 discloses a method of creating a thumbnail image for which a certain viewpoint (specified on the basis of the presence of an object or part of the object, a spatial position, color, or character information) is specified.

In Japanese Patent Laid-Open No. 2004-151979, however, creation of a thumbnail image corresponding to a shape characteristic of 3D model data has not been considered. For the user, it is desirable to enable automatic creation of a thumbnail image containing a feature portion of 3D model data, thereby facilitating identification of a 3D model data file.

SUMMARY OF THE INVENTION

Thus, the present disclosure provides a thumbnail image creation apparatus that facilitates identification of a three-dimensional model data file by detecting a plane containing a feature portion of 3D model data and by presenting a thumbnail image created based on a viewpoint representing this plane.

The present disclosure provides a thumbnail image creation apparatus including at least one processor coupled to at least one memory. The at least one processor is programmed to create a thumbnail image of a three-dimensional (3D) model contained in 3D model data, and a thumbnail image is created so that the thumbnail image contains a feature portion of the 3D model.

Further features of the present disclosure will become apparent from the following description of exemplary embodiments with reference to the attached drawings.

DESCRIPTION OF THE EMBODIMENTS

Embodiments for implementing the present disclosure will be exemplarily described below with reference to the drawings. Note that the dimensions, materials, shapes, and relative positions of members described in the following embodiments, control procedures, control parameters, target values, and so forth are not intended to limit the scope of the present disclosure to only them unless a specific description is given in particular.

The present disclosure provides a thumbnail image creation apparatus that creates a thumbnail image of 3D model data. A viewpoint of the thumbnail image is determined so that the thumbnail image contains a feature of a 3D model. The thumbnail image creation apparatus may be part of a 3D model data management system. In the embodiments, descriptions will be provided on the assumption that the thumbnail image creation apparatus is part of the 3D model data management system. However, the present disclosure is not limited to the thumbnail image creation apparatus being part of the 3D model data management system.

First Embodiment

Figure 1:
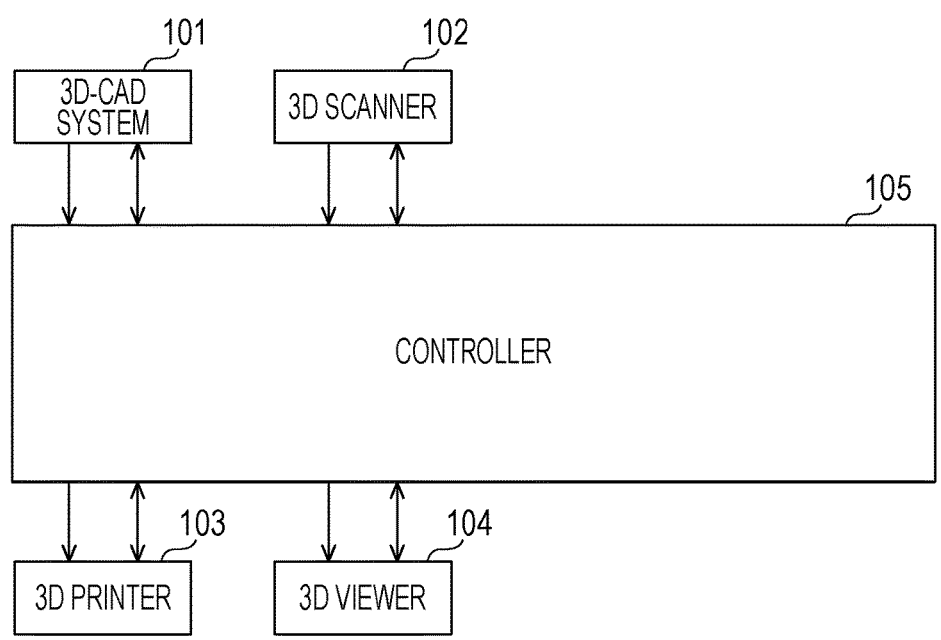
FIG. 1 schematically illustrates the configuration of a 3D model data management system according to a first embodiment.

FIG. 1 schematically illustrates the configuration of a 3D model data management system according to a first embodiment of the present disclosure.

In FIG. 1, 101 denotes a 3D-computer aided design (CAD) system, and the 3D-CAD system 101 outputs CAD data for three-dimensional modeling.

As for CAD data, Standard for the Exchange of Product Model data (STEP): ISO 10303 is an international standard developed by the International Organization for Standardization (ISO). This standard has been developed by the subcommittee SC4 of the ISO technical committee TC184. In addition to this, there are a lot of CAD data. The output 3D-CAD data is input to a controller 105 to be described. The 3D-CAD system 101 is connected to the controller 105 with a control line, and signals, such as a command from the controller 105 and a response from the 3D-CAD system 101, are controlled.

A reference numeral 102 denotes a 3D scanner, and the 3D scanner 102 outputs, as a point cloud, three-dimensional information obtained by scanning a three-dimensional object. A point cloud is a set of apexes in three-dimensional space. The output point cloud is input to the controller 105 to be described. The 3D scanner 102 is connected to the controller 105 with a control line, and signals, such as a command from the controller 105 and a response from the 3D scanner 102, are controlled.

A reference numeral 103 denotes a 3D printer, and the 3D printer 103 receives three-dimensional modeling data from the controller 105, and creates a three-dimensional modeled object. An example of the three-dimensional modeling data received by the 3D printer 103 is Standard Triangulated Language (STL) data. This represents a three-dimensional shape as a collection of small triangles. The three-dimensional modeling data is data obtained by adding information necessary for three-dimensional modeling to 3D model data to be described, and is output to the 3D printer 103 via the controller 105.

The output three-dimensional modeling data is input to the controller 105 to be described. The 3D printer 103 is connected to the controller 105 with a control line, and signals, such as a command from the controller 105 and a response from the 3D printer 103, are controlled.

A reference numeral 104 denotes a 3D viewer, and the 3D viewer 104 receives three-dimensional modeling data from the controller 105, and creates three-dimensional information. An example of the three-dimensional modeling data received by the 3D viewer 104 is data used in Mixed Reality (MR). This is three-dimensional data smaller in size than three-dimensional modeling data. The output three-dimensional modeling data is input from the controller 105 to be described. The 3D viewer 104 is connected to the controller 105 with a control line, and signals, such as a command from the controller 105 and a response from the 3D viewer 104, are controlled.

Figure 2:
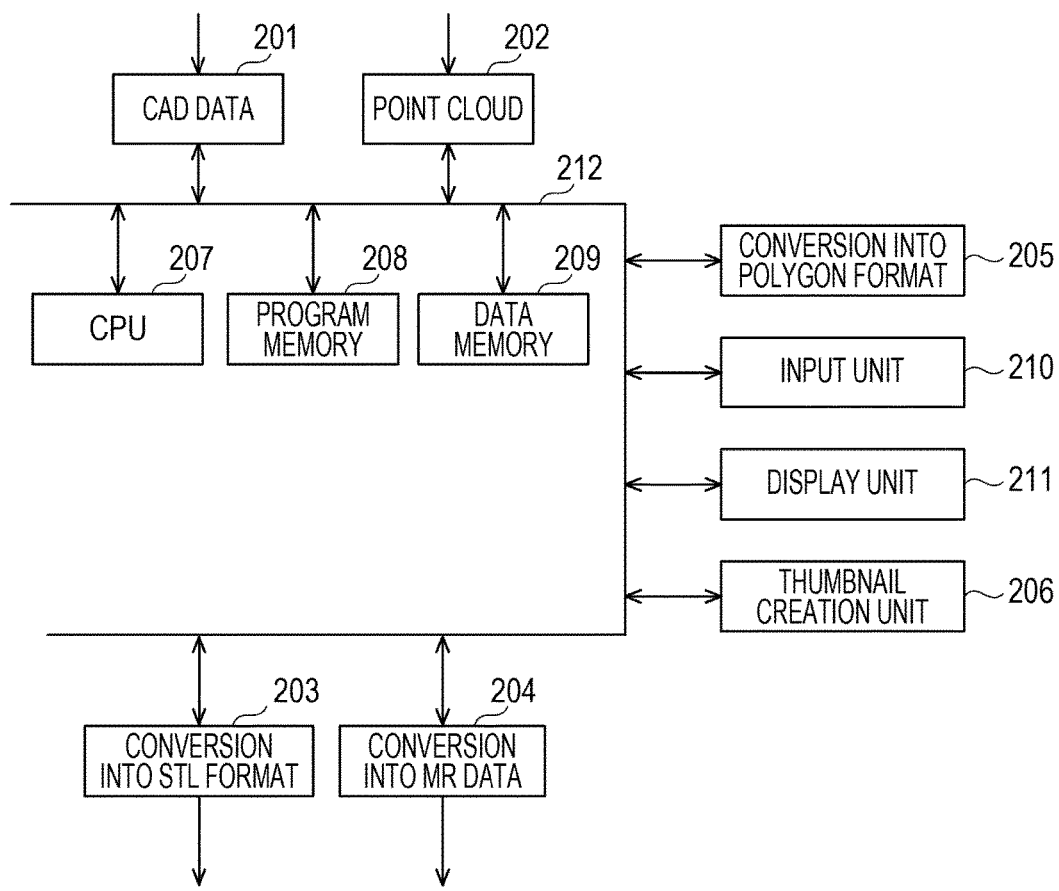
FIG. 2 illustrates details of a controller of the 3D model data management system according to the first embodiment.

A reference numeral 105 denotes a controller. The details of the controller 105 are illustrated in FIG. 2. Blocks to be described are connected via a system bus 212.

In FIG. 2, 201 denotes receiving a signal output from the 3D-CAD system 101. This information is 3D-CAD data. The input 3D-CAD data is stored in, for example, a data memory 209 to be described via the system bus 212.

A reference numeral 202 denotes receiving a signal output from the 3D scanner 102. This information is a point cloud. The input point cloud is stored in, for example, the data memory 209 to be described via the system bus 212.

A reference numeral 203 is a block for conversion into an STL format in which three-dimensional information subjected to conversion into a polygon format is received from the system bus 212, and in which this information is converted into STL data, and is output to the 3D printer 103.

A reference numeral 204 is a block in which three-dimensional information subjected to conversion into a polygon format is received from the system bus 212, and in which this information is converted into data for virtual display, such as Mixed Reality (MR) or Virtual Reality (VR), and is output to the 3D viewer 104.

A reference numeral 205 is a block for conversion into a polygon format in which CAD data or point cloud information stored in the data memory 209 is received, and in which this data is converted into polygon data. The data subjected to conversion into a polygon format is stored in, for example, the data memory 209 to be described via the system bus 212.

Here, in some cases, the CAD data in the block 201 or the point cloud in the block 202 is directly received without being stored in the data memory 209, and this data is converted into polygon data in the block 205 for conversion into a polygon format. Additionally, in some cases, CAD data or a point cloud is input as polygon data via a network, and is stored in the data memory 209.

This polygon data is called 3D model data, and is typically used for use or management of 3D data. The 3D model data is displayed on a display as data appropriate for identification of a model image in three-dimensional modeling, and is used for a user checking or processing the data.

A reference numeral 206 denotes a thumbnail creation unit that creates a thumbnail image. A thumbnail image of the 3D model data displayed on a display unit 211 is created. For example, a thumbnail image is created at a point in time when the 3D model data is stored after the 3D model data is subjected to editing and processing.

A thumbnail of this 3D model data is created and used to enhance the convenience of use or management of the 3D model data.

Figure 3:
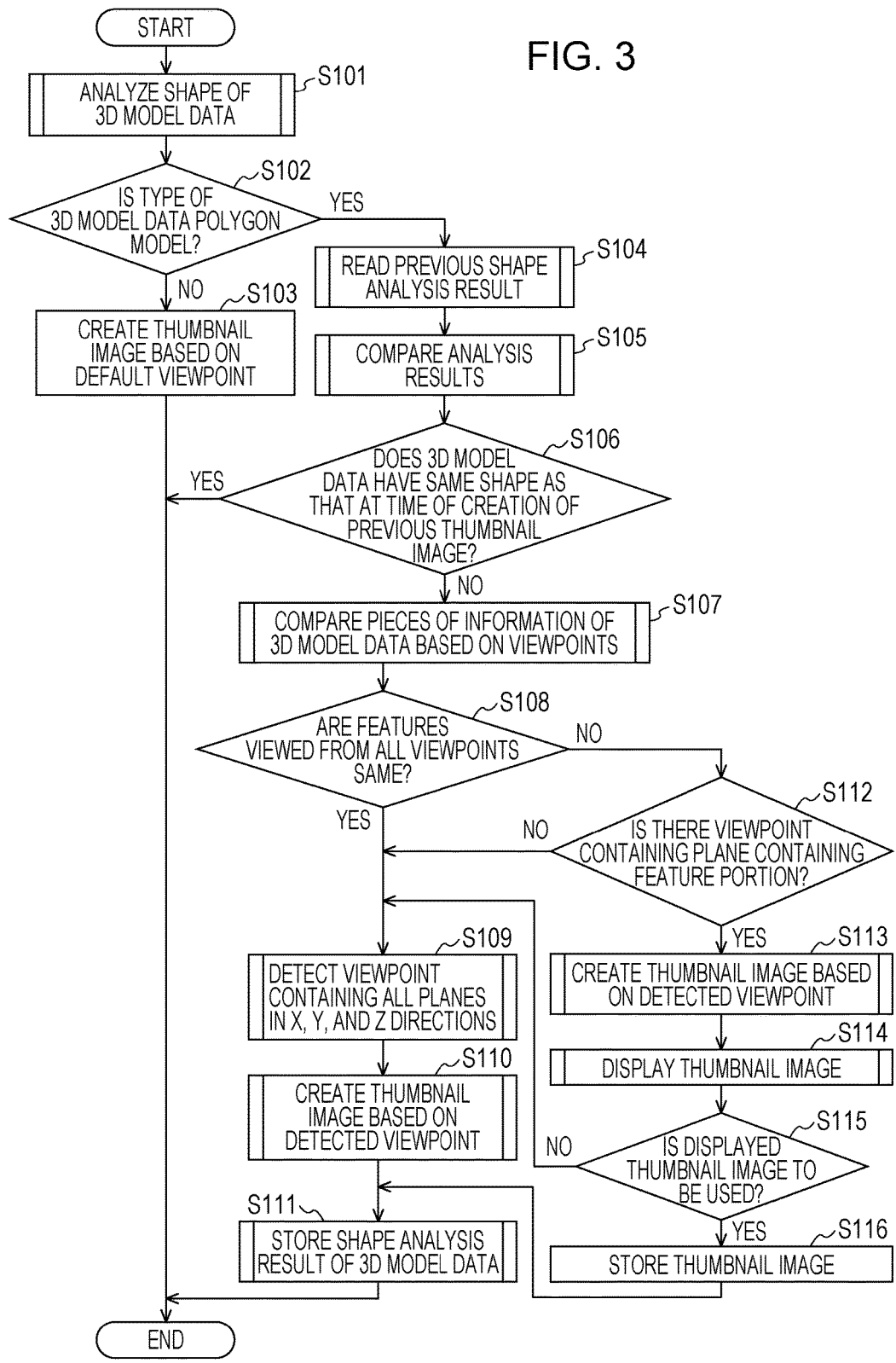
FIG. 3 is a flowchart illustrating control performed by the controller of the 3D model data management system according to the first embodiment.
Figure 4:
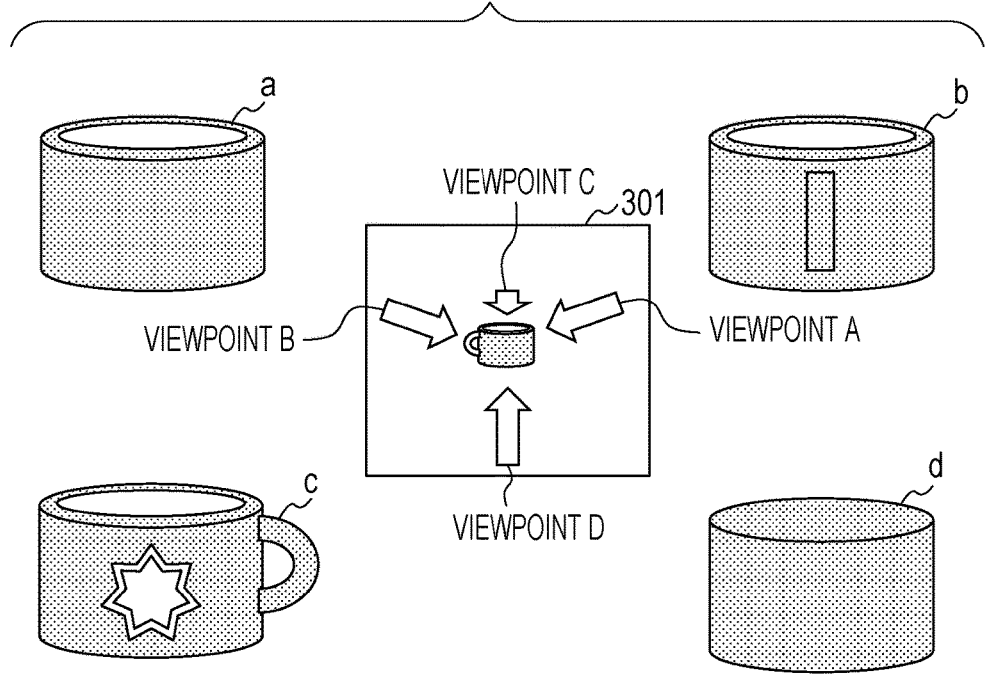
FIG. 4 illustrates an example of 3D model data having a characteristic shape (feature portion).
Figure 4:
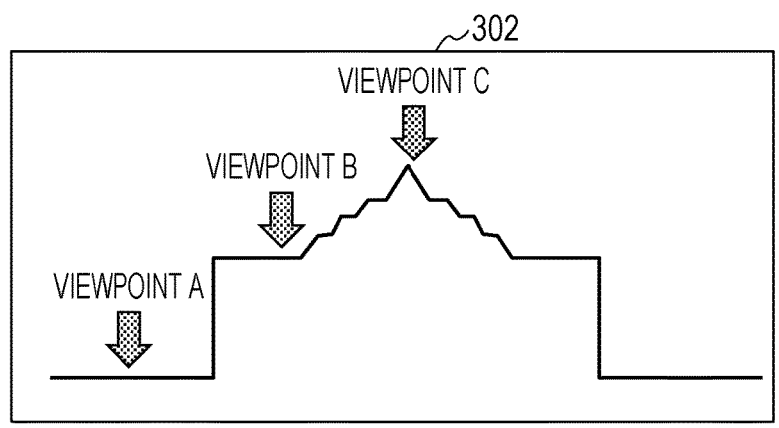

A reference numeral 207 denotes a CPU, and the CPU 207 is a central processing unit, which may include one or more processors and one or more memories, that executes control illustrated in FIGS. 3 and 4 on the basis of a control program on a program memory 208. As used herein, the term "unit" generally refers to any combination of software, firmware, hardware, or other component, such as circuitry, that is used to effectuate a purpose.

A reference numeral 208 denotes a program memory storing a program for executing control.

A reference numeral 209 denotes a data memory for storing various pieces of information, such as 3D-CAD information, point cloud information, polygon information, STL information, data for virtual display, and an operation history.

A reference numeral 210 denotes an input unit that detects input information from an operation unit, which is not illustrated, or the like. The input information is output to the system bus 212.

A reference numeral 211 denotes a display unit for displaying various pieces of information. At least a model image of 3D model data can be displayed on the display unit 211. Information is received from the system bus 212, and is displayed by the display unit 211.

First Practical Example

A desirable embodiment of the present disclosure will be described below with reference to the attached drawings. Note that the embodiment described below represents one example of the case where the present disclosure is embodied, and is one of specific practical examples of the configuration described in claims.

A specific example of control performed by the controller 105 in a first practical example of the present disclosure will be described with reference to FIG. 3.

In FIG. 3, when a thumbnail image creation process starts, 3D model data is analyzed in S101.

Although information obtained by analyzing 3D model data is assumed to be, for example, the type of the 3D model data contained in the 3D model data, the number of planes, number of apexes, and number of polygons of a model for each viewpoint, the size of each polygon, and the color of each polygon, the information is not limited to these. A viewpoint herein refers to an angle at which the model is viewed (a coordinate direction), and information of the 3D model data of the model viewed from a plurality of viewpoints is obtained in the analysis of the 3D model data. As for a plurality of viewpoints, the user may specify any plurality of viewpoints through a graphical user interface (GUI), or may determine viewpoints on a program in advance.

Then, in S102, it is checked, on the basis of an analysis result obtained in S101, whether the type of the 3D model data is a polygon model.

When the type of the 3D model data is a model other than the polygon model in S102, the process proceeds to S103, and a default thumbnail image is obtained, and is stored in the data memory 209 in association with a 3D model data file being currently dealt with. A default thumbnail image may be created on the basis of a certain viewpoint specified by the user through a GUI, or may be created on the basis of a viewpoint specified on a program in advance. Alternatively, a static image or icon for a thumbnail prepared in advance for each type of 3D model data may be used instead of dynamically creating a thumbnail image.

On the other hand, when the polygon model is detected in S102, the process proceeds to S104, and an analysis result of 3D model data at the time of creation of a previous thumbnail image is read.

Then, in S105, the analysis result obtained in S101 is compared with the analysis result read in S104. Subsequently, in S106, it is checked, from a comparison result obtained in S105, whether there is a change in the shape of the 3D model data with respect to the shape of the 3D model data at the time of creation of the previous thumbnail image, that is, whether the 3D model data has the same shape as that at the time of creation of the previous thumbnail image. As a result, when a change is detected, that is, when the 3D model data does not have the same shape, the process proceeds to S107. In S106, when there is no change with respect to the previous analysis result, that is, when the 3D model data has the same shape, the process ends because a thumbnail does not have to be created again.

Then, in S107, pieces of information of the 3D model data based on a plurality of viewpoints obtained in the analysis in S101 are compared. Subsequently, in S108, when shapes viewed from all the viewpoints are the same, the process proceeds to S109. An example in which the shapes viewed from all the viewpoints are the same applies to the case where the shape of the 3D model data is spherical.

Then, in S109, a viewpoint containing all planes in X, Y, and Z directions is detected, and subsequently, in S110, a viewpoint of a thumbnail image is determined on the basis of the detection in S109. That is, a thumbnail image based on the detected viewpoint is created. Then, in S111, this thumbnail image and the analysis result of the 3D model data are stored in the data memory 209 in association with the 3D model data file being currently dealt with, and the process ends.

On the other hand, when the shape varies according to the viewpoints in S108, the process proceeds to S112. In S112, when a viewpoint containing a plane containing a feature portion is detected on the basis of the analysis result obtained in S101, that is, when a feature portion is detected, the process proceeds to S113, and a thumbnail image based on the viewpoint containing the plane containing the feature portion is created.

As for a viewpoint containing a plane containing a feature portion herein, the number of apexes of a model shape viewed from the viewpoint is larger by not less than a certain number in comparison with that of a model shape viewed from another viewpoint. A specific example will be described with reference to FIG. 4.

FIG. 4 illustrates an example of 3D model data having a plane containing a feature portion in an appearance. In FIG. 4, a, b, c, and d are views of the appearance viewed from viewpoints A, B, C, and D, respectively. The view of the appearance viewed from the viewpoint D illustrates a state in which the bottom is turned up. A reference numeral 301 is a conceptual diagram representing the relationship between a model and viewpoints. A reference numeral 302 is a graph representing variations in the number of apexes for each viewpoint exhibited when a viewpoint varies such that it moves around the perimeter of the model from the viewpoint A to the viewpoint B to the viewpoint C and then back to the viewpoint A.

In this example, the number of apexes of the model viewed from the viewpoint C is larger by not less than a certain number in comparison with the numbers of apexes of the model viewed from the other viewpoints, and thus the viewpoint C is determined to be a viewpoint containing a plane containing a feature portion. As for a value not less than the certain number, that is, as for a threshold value of the number of apexes from which a viewpoint is determined to be a viewpoint containing a plane containing a feature portion as compared with peripheral shapes, the user may specify any number of apexes through a GUI, or may specify a value on a program in advance.

Although FIG. 4 illustrates the case where a viewpoint containing a plane containing a feature portion is specified in accordance with variations in the number of apexes, the number of polygons for each viewpoint may be used, for example. A large number of polygons refer to the fact that the shape of a part having the polygons is complex, and thus the part is considered to have a feature portion as compared with a part having a small number of polygons. Furthermore, a condition for specifying a viewpoint is not limited to a solid shape, and a viewpoint containing a plane containing a feature portion may be specified in accordance with color or a pattern. In the case where a viewpoint containing a plane containing a feature portion is determined in accordance with color or a pattern, it can be determined, in accordance with histogram variations for each viewpoint, that a viewpoint contains a plane containing a feature portion.

Then, in S114, the thumbnail image created in S113 is displayed on the display unit 211.

Then, in S115, the controller 105 makes an inquiry to the user to determine whether the thumbnail image displayed on the display unit 211 is to be used as a thumbnail image of the 3D model data file being currently dealt with, and waits for a user's input. As a result, when a user's input is Yes (Yes in S115), the process proceeds to S116, and this thumbnail image is stored in the data memory 209 in association with the 3D model data file being currently dealt with.

On the other hand, in S112, when no viewpoint containing a plane containing a feature portion is detected, the process proceeds to S109.

Furthermore, in S115, when the user does not agree to use the thumbnail image presented to the user in S114 through the display unit 211 (No in S115), the process also proceeds to S109, and the subsequent operations are performed.

As described above, according to the first practical example, a viewpoint containing a plane containing a feature portion is detected, and thus a thumbnail image can be created, then be stored in association with a 3D model data file being dealt with, and be managed. As a result, as for the content of 3D model data, a thumbnail image that is highly recognizable can be displayed, therefore producing an effect of facilitating identification of the 3D model data file for the user.

The thumbnail image creation apparatus according to the present disclosure may be a 3D model data management system including the above-described thumbnail image creation apparatus that creates a thumbnail, and a display apparatus.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, there can be provided a thumbnail image creation apparatus that facilitates identification of a three-dimensional model data file by detecting a plane containing a feature portion of 3D model data and by presenting a thumbnail image created based on a viewpoint containing this plane.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-114268, filed Jun. 4, 2015, which is hereby incorporated by reference herein in its entirety.

What is claimed is:

1. A three-dimensional (3D) printing system comprising:
   a 3D printer;
   a processor;
   a memory storing instructions to be executed by the processor; and
   an interface configured to receive an input from a user;
   wherein, on a basis of the instructions, the processor executes:
   editing 3D model data;
   analyzing the edited 3D model data;
   creating a thumbnail image of the edited 3D model data taken from a viewpoint based on the analysis;
   displaying the thumbnail image on a display and receiving an input from the user regarding whether or not to use the thumbnail image as a thumbnail image of the edited 3D model data; and
   in a case where an affirmative input is received from the user, associating the thumbnail image with the edited 3D model data and storing the thumbnail image and the edited 3D model data into the memory.

2. The 3D modeling system according to claim 1,
   wherein the processor analyzes the edited 3D model data,
   wherein the processor creates a thumbnail image in a case where there is a change in the 3D model data due to editing the 3D model data, and
   wherein the processor does not create a thumbnail image in a case where there is no change in the 3D model data.

3. A method of controlling a three-dimensional (3D) printing system, the method comprising:
   editing 3D model data;
   analyzing the edited 3D model data;
   creating a thumbnail image of the edited 3D model data taken from a viewpoint based on the analysis;
   displaying the thumbnail image and receiving an input from the user regarding whether or not to use the thumbnail image as a thumbnail image of the edited 3D model data; and
   in a case where an affirmative input is received from the user, associating the thumbnail image with the edited 3D model data and storing the thumbnail image and the edited 3D model data into a memory.

4. The method of controlling the 3D printing system according to claim 3, further comprising:
   analyzing the edited 3D model data;
   creating a thumbnail image in a case where there is a change in the 3D model data due to editing the 3D model data; and
   not creating a thumbnail image in a case where there is no change in the 3D model data.

5. A non-transitory computer readable medium on which a program is recorded to cause a computer to perform a method of controlling a three-dimensional (3D) printing system, the method comprising:
   editing 3D model data;
   analyzing the edited 3D model data;
   creating a thumbnail image of the edited 3D model data taken from a viewpoint based on the analysis;
   displaying the thumbnail image and receiving an input from the user regarding whether or not to use the thumbnail image as a thumbnail image of the edited 3D model data; and
   in a case where an affirmative input is received from the user, associating the thumbnail image with the edited 3D model data and storing the thumbnail image and the edited 3D model data into a memory.

6. A system comprising:
   a processor;
   a memory storing instructions to be executed by the processor; and
   an interface configured to receive an input from a user;
   wherein, on a basis of the instructions, the processor executes:
   editing three-dimensional (3D) model data;
   analyzing the edited 3D model data;
   creating a thumbnail image of the edited 3D model data taken from a viewpoint based on the analysis;
   displaying the thumbnail image on a display and receiving an input from the user regarding whether or not to use the thumbnail image as a thumbnail image of the edited 3D model data; and
   in a case where an affirmative input is received from the user, associating the thumbnail image with the edited 3D model data and storing the thumbnail image and the edited 3D model data into the memory.

7. The system according to claim 6,
   wherein the processor analyzes the edited 3D model data,
   wherein the processor creates a thumbnail image in a case where there is a change in the 3D model data due to editing the 3D model data, and wherein the processor does not create a thumbnail image in a case where there is no change in the 3D model data.

* * * * *